United States Patent
Goringe et al.

(10) Patent No.: US 7,707,115 B2
(45) Date of Patent: Apr. 27, 2010

(54) PERIODIC SOFTWARE LICENSING SYSTEM

(75) Inventors: Chris Goringe, Seven Hills (AU);
Rohan Lenard, Crows Nest (AU);
Julian J. Orbach, Ryde (AU); Martin Smyrk, Collaroy Plateau (AU)

(73) Assignee: Avaya Inc., Basking Ridge, NJ (US)

( * ) Notice: Subject to any disclaimer, the term of this patent is extended or adjusted under 35 U.S.C. 154(b) by 1079 days.

(21) Appl. No.: 10/205,244

(22) Filed: Jul. 25, 2002

(65) Prior Publication Data
US 2004/0019565 A1    Jan. 29, 2004

(51) Int. Cl.
*G06F 17/60* (2006.01)

(52) U.S. Cl. .................................................. 705/59

(58) Field of Classification Search ............... 705/59; 709/203; 707/104.1
See application file for complete search history.

(56) References Cited

U.S. PATENT DOCUMENTS

| | | | |
|---|---|---|---|
| 5,548,722 A * | 8/1996 | Jalalian et al. | 709/220 |
| 5,579,479 A * | 11/1996 | Plum | 726/28 |
| 5,671,412 A * | 9/1997 | Christiano | 707/104.1 |
| 5,790,664 A * | 8/1998 | Coley et al. | 709/203 |
| 6,189,146 B1 * | 2/2001 | Misra et al. | 705/59 |
| 6,584,450 B1 * | 6/2003 | Hastings et al. | 705/26 |
| 6,889,212 B1 * | 5/2005 | Wang et al. | 705/59 |
| 2001/0011253 A1 * | 8/2001 | Coley et al. | 705/59 |
| 2004/0010440 A1 * | 1/2004 | Lenard et al. | 705/10 |

FOREIGN PATENT DOCUMENTS

JP       2001228928 A    *    8/2001

* cited by examiner

*Primary Examiner*—Pierre E Elisca
(74) *Attorney, Agent, or Firm*—Sheridan Ross P.C.

(57) ABSTRACT

The period software licensing system allows the customer to create a software license schedule that includes one or more time periods during which application file usage is allowed and identifies the maximum number of concurrent application files allowed during the corresponding time period. The software license schedule may include a plurality of time periods each having a different corresponding maximum number of concurrent user allowed. The software management system authorizes concurrent usage of application files based on the time period during which an application file usage request is received and the number of concurrent users presently authorized.

14 Claims, 3 Drawing Sheets

SOFTWARE LICENSE SCHEDULE

| START DAY | END DAY | START TIME | END TIME | CONCURRENT USERS |
|---|---|---|---|---|
| MONDAY | MONDAY | 6:00 AM | 6:00 PM | 4 |
| MONDAY | FRIDAY | 6:00 PM | 6:00 AM | 2 |
| TUESDAY | FRIDAY | 6:00 AM | 6:00 PM | 3 |
| SATURDAY | SUNDAY | 6:00 AM | 6:00 PM | 0 |
| SATURDAY | SUNDAY | 6:00 PM | 6:00 AM | 0 |

PERIODIC SOFTWARE LICENSING SYSTEM

FIELD OF THE INVENTION

The invention relates to software license management, and in particular to a system for controlling the number of users that concurrently use a licensed software file during scheduled time periods.

PROBLEM

It is a problem in the software field to prevent unauthorized users from accessing and using an application file while also providing a method to allow customers to purchase and concurrently use a variable number of copies of the application file based on the periodic needs of the business. A number of software publishers license software files under a pricing model wherein a customer purchases the right to concurrently use a predetermined number of application file copies for a predetermined period of time. Application files that are sold for concurrent use are often delivered with license management software installed on a license server, from which the user requests concurrent usage of an application file. The licensing management software ensures that the customer does not use more software licenses than they have purchased and are entitled to use. A problem arises when a customer's application file usage requirements vary periodically.

Effective management of multiple copies of application files and software licenses presents a major dilemma for computer site administrators and software application publishers. The focus of control for managing multiple copies of an application file or application file software licenses is the physical location of the application file or the program disk. The details of controlling physical access and the degree of inconvenience vary, but in a world of hard disks, networks, file servers and electronic email, management based on controlled distribution is intrinsically impractical or even impossible. Without any practical tools, site administrators are forced to rely on a rather ill defined "reasonable effort" at software license compliance.

A common solution has been to purchase the right to concurrently access and use a specified number of application files by agents operating at one or more sites in a variety of locations. The concurrent usage is typically for a predetermined length of time such as for one year. There are disadvantages to this approach. The customer is required to purchase the right to concurrently access and use enough application file copies to fulfill the business needs during peak operation. In other words, although the number of concurrent users required by the customer varies, the number of application files licensed for concurrent use remains constant. Therefore, a business having a peak demand time on Monday requiring one hundred concurrent users may only have a need for seventy-five concurrent users during non-peak operation. Thus, the business is required to license, and therefore pay for, the right to concurrently use the number of application files required for peak operation. While this solution provides the customer with more benefits than the previous method of paying a fixed charge for an unlimited number of concurrent uses, the benefit gained by the customer still does not match the price paid by the customer For these reasons, a need exists for a flexible system to allow the customer to purchase concurrent usage that varies the number of concurrent users based on the customer's business needs.

SOLUTION

The period software licensing system allows the customer to purchase variable concurrent application file usage based on the customer's business needs. A software license schedule is created that includes one or more time periods during which application file usage is allowed and identifies the maximum number of concurrent application files allowed during the corresponding time period. The software license schedule may include a plurality of time periods each having a different corresponding maximum number of concurrent users. The software management system authorizes concurrent usage of application files based on the time period during which an application file usage request is received, the number of concurrent users presently authorized, and the maximum number of concurrent users allowed during the time period.

DETAILED DESCRIPTION OF THE DRAWINGS

The periodic software licensing system summarized above and defined by the enumerated claims may be better understood by referring to the following detailed description, which should be read in conjunction with the accompanying drawings. This detailed description of the preferred embodiment is not intended to limit the enumerated claims, but to serve as a particular example thereof. In addition, the phraseology and terminology employed herein is for the purpose of description, and not of limitation.

A number of software providers license software files under a pricing model wherein a customer purchases the right to concurrently use a predetermined number of application files, for a predetermined length of time. Software files that are sold for concurrent use are often delivered with license management software installed on a license server, from which the customer requests concurrent application file usage. The licensing management software ensures that the customer does not concurrently use more software licenses than they have purchased and are entitled to use.

The present periodic software licensing system allows a software provider to license a variable number of concurrent usages of application files based on the customer's business needs. For example, an organization may have peak operating requirements based on seasonal changes, holidays or unique events and lower application file usage requirements during non-peak times. Similarly, a customer site operating 24 hours per day, 7 days a week, may require concurrent usage for 60 agents during the day time peak operation and yet require only 20 concurrent users during the night time. In this second example, the customer may purchase a tailored software license agreement to concurrently use 60 copies of an application file between 6 am and 6 pm and to concurrently use only 20 copies during the slower night time hours between 6 pm and 6 am. The business may also require 20 concurrent users on Saturday and Sunday.

Allowing the customer to license concurrent application file usage based on the customer's needs provides the customer with a method for paying for concurrent usage based on variable needs. The flexible software licensing and the cost associated with the software licensing is based on the benefit received by the customer for concurrent usage instead of requiring the customer to license enough software licenses to cover the peak operation.

Figure 1:
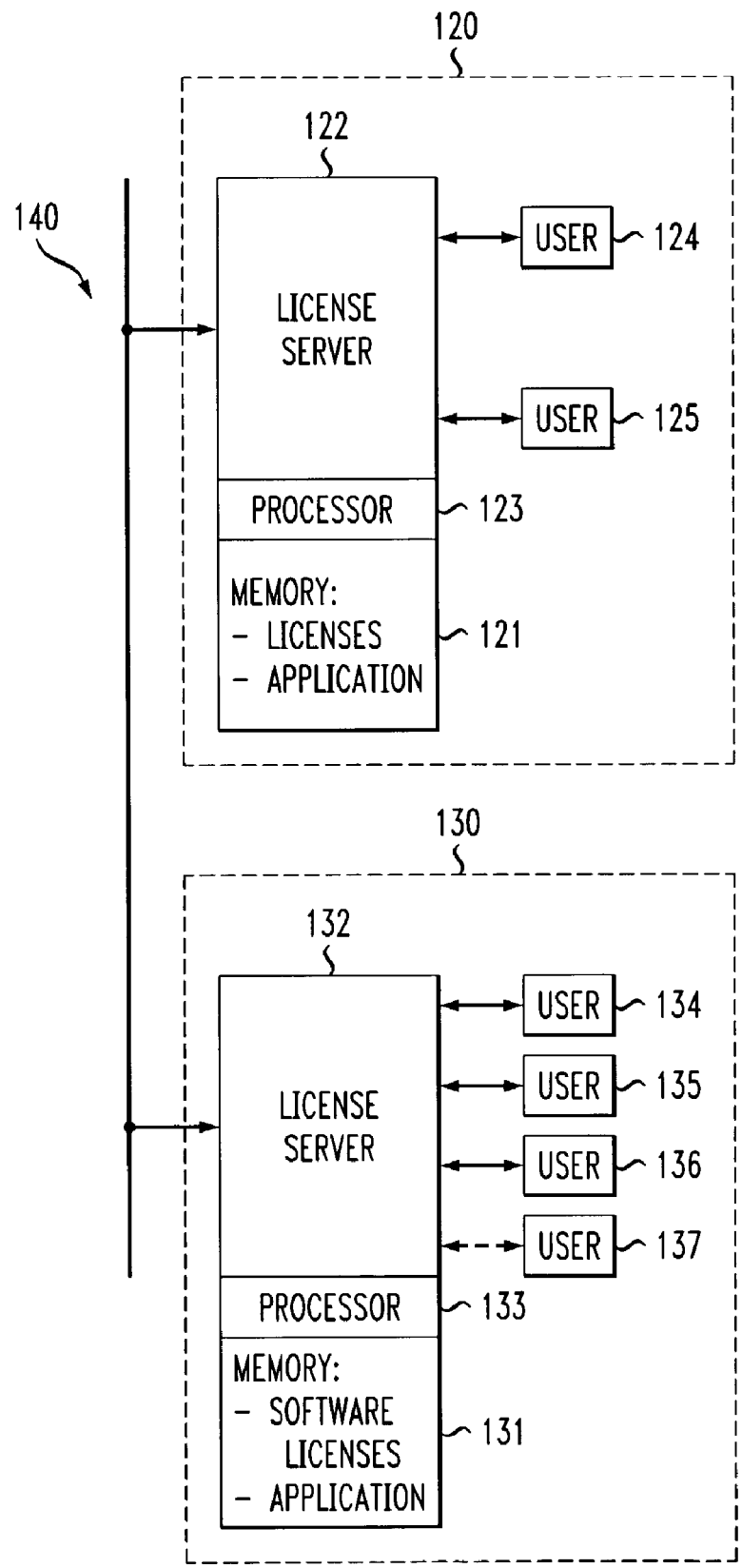
FIG. 1 illustrates in block diagram form a multi-site organization using the present periodic software licensing system.

Periodic Software Licensing System—FIG. 1:

The present periodic software licensing system may be configured to operate at a single site or between two or more sites. For purpose of discussion, a multi-site organization operating internationally is illustrated in the block diagram of FIG. 1. In this configuration, a set of software licenses is shared amongst two sites 120 and 130. The first site 120 may be in the United States (hereinafter referred to as US site) on Mountain Standard Time (MST) whereas the second site, the Australian site 130 in Brisbane, Australia is on Australian Eastern Standard Time (AEST). Both sites operate between the hours of 8 am and 5 pm, and therefore overlap 1 hour from 4 pm to 5 pm MST (8 am to 9 am AEST). Each site may include a license server, 122 and 132, for controlling software license distribution at the particular site. License servers 122 and 132 are linked together via a communication channel 140 such as a wide area network (WAN) for sharing concurrent application file usage authorization and software license schedules. The license servers include a processor for executing a software license management application and a memory for storing application file usage authorization and software license schedules.

While the following description discusses a software management system which manages copies of a single application file that has a corresponding software license schedule, the present periodic licensing system can be configured to manage more than one application file type and have one or more software license schedules corresponding to each of the application file types.

Figures 2, 3:
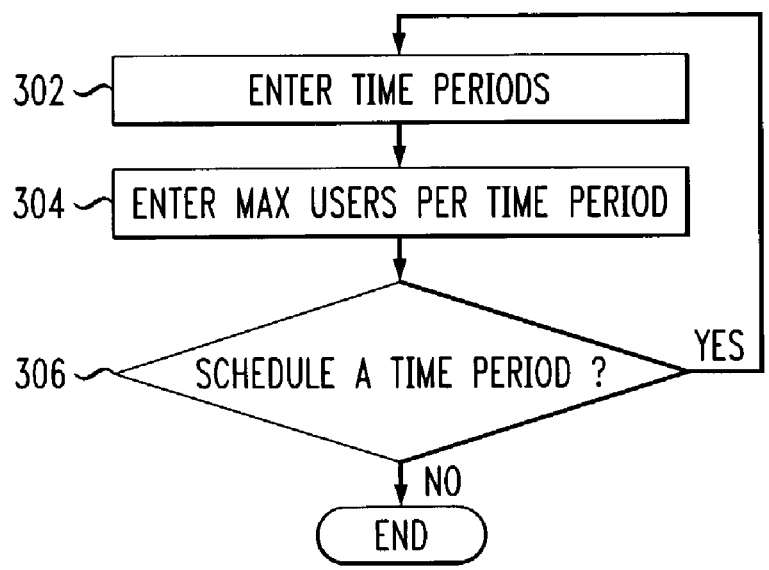
FIG. 2 illustrates a software license schedule utilized with the present period licensing system.
FIG. 3 is a flow diagram for creating the software license schedule of FIG. 2.

Software License Schedule—FIGS. 2 and 3:

Referring to software license schedule 200 illustrated in FIG. 2, the day of the week 202-204, the start and end time of day 206-208, and the number of concurrent users 210 are identified. In this example, the number of concurrent application file users is adjustable in twelve hour increments. Therefore, the business may have an alternative number of concurrent users between 6 am and 6 pm MST than between the hours of 6 pm and 6 am MST. Similarly, the number of concurrent users can be adjusted for each day of the week. Since the business operates in two countries wherein the business hours of each respective site is approximately 16 hours different, the business may license an alternative number of software licenses for each twelve hour time period based on the number of employees located at each site.

Referring to the block diagram of FIG. 2 in conjunction with the software license schedule of FIG. 3, in this example the peak operating time is Monday between the hours of 6 am and 6 pm MST. Therefore, four application files are available for concurrent usage by users at the U.S. site 120 whereas Tuesday through Friday only three concurrent users may be authorized between the hours of 6 am and 6 pm MST. Since the Australian site 130 has fewer users, the number of concurrent users may be reduced to two application files between the hours of 6 pm and 6 am MST. Unlike the prior art software license management systems where the customer paid for concurrent usage of the peak number of concurrent application file usages seven days a week and 24 hours a day, the present periodic software licensing system allows the customer to schedule concurrent application file usage based on the operation of the business.

While the example illustrated and described above included two sites with fewer than 4 concurrent users that worked 8 am to 5 pm schedule, an alternate number of sites and/or concurrent users may be substituted and an alternative software license schedule created to meet the needs of the specific business. Similarly, while the peak operating hours were described as Monday between 8 am and 5 pm, alternate peak operating hours such as seasonal, holidays or other business peak times may be substituted.

A customer operating internationally may require an alternative number of concurrent application file usages during overlapping time periods. Therefore the present periodic software licensing system allows the customer to configure two or more software license schedules in concert to ensure that the total number of concurrent users (world-wide) does not exceed a scheduled limit, thereby respecting local usage peaks without requiring ongoing network communication between the sites. In this embodiment, each site may have a software license schedule wherein the software license management system operating at that site manages concurrent usage of the scheduled number of concurrent application file usages allowed.

Operationally, the present periodic software licensing systems allows the software provider to create a software schedule to meet the customer's business needs. Referring to the flow diagram of FIG. 3, creating a software license schedule involves recording time periods in step 302 and recording a maximum number of concurrent users in step 304 that may be authorized to access and use an application file during the corresponding time period. Recoding time periods may include scheduling a day of the week, and one or more specific time periods corresponding to the day of the week.

While the previous example included two twelve hour time periods, the time periods may be broken down in one hour increments, half hour increments or an alternative increment. Likewise, although the previous example scheduled concurrent usage based on days of the week, a business may select concurrent usage based on dates. For example, the airline industry may increase staffing and therefore concurrent application file usage requirements during the holidays when travel time is at a peak. Providing a method for creating a software license schedule that is tailored to the customer's needs allows the customer to pay for concurrent usage according to the benefit the customer receives from the concurrent usage. Once the software license schedule is completed, the software management system is configured for day-to-day operation.

Figure 4:
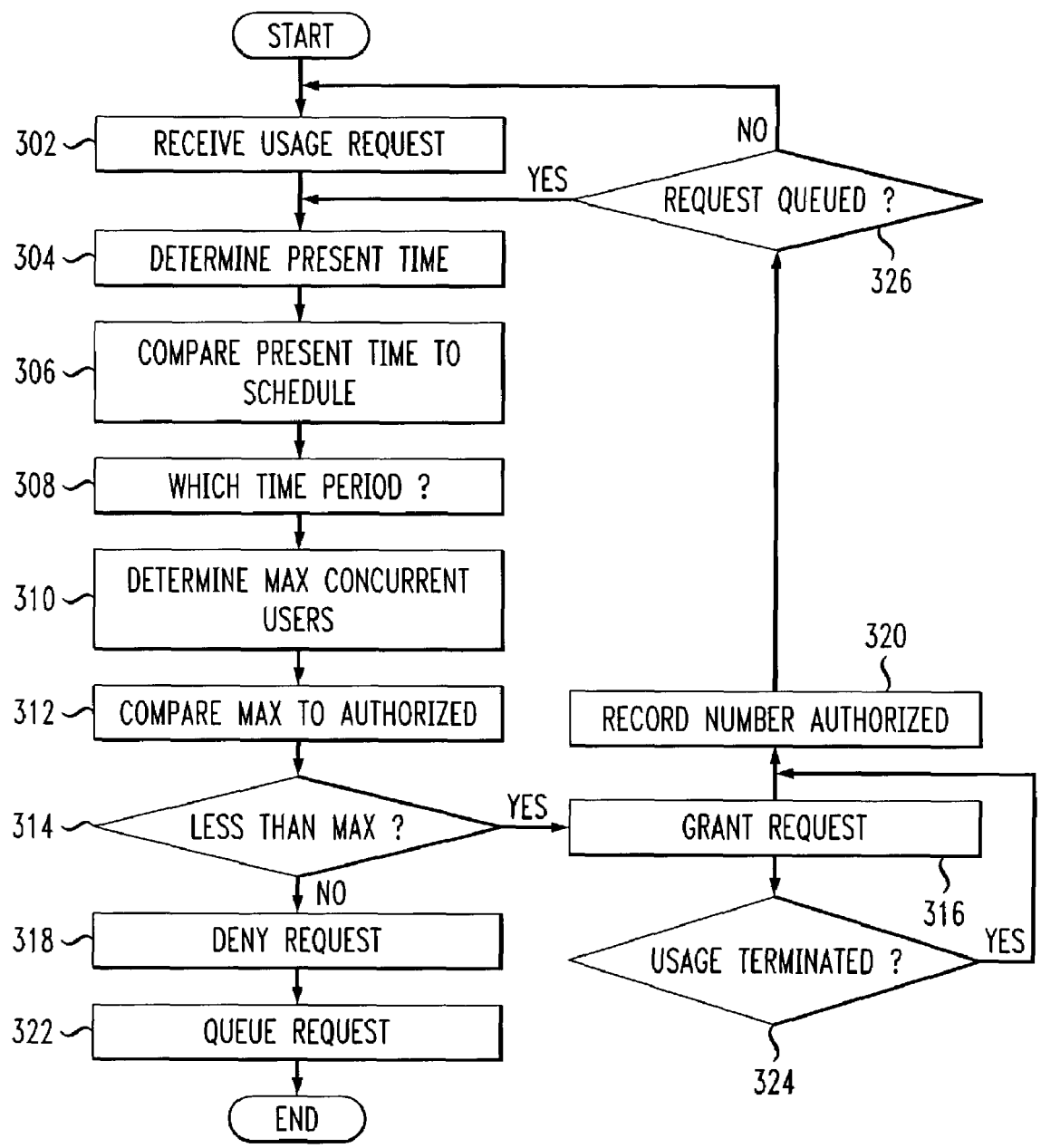
FIG. 4 is an operational flow diagram of the present periodic software licensing system.

Operational Characteristics—FIG. 4:

Referring to the operational flow diagram of FIG. 4, the software license managements system receives application file usage requests from one or more users in step 302. The present time is determined in step 304 and compared to the software license schedule in step 306. After determining the scheduled time period the present time period corresponds with in step 308, the maximum number of concurrent users that may be authorized during the corresponding time period is determined in step 310. As application file usage requests are granted, the number of authorized concurrent users is recorded in step 320. The recorded number of authorized concurrent users from step 320 is compared in step 312 to the maximum number of concurrent users allowed during the scheduled time period. If the number of authorized concurrent users from step 320 is less than the maximum number of concurrent users allowed in the software license schedule in step 314, the application file usage request is granted in step 316 and the number of authorized concurrent users is updated in step 320.

If the number of authorized concurrent users from step 320 is greater than or equal to the maximum number of concurrent users allowed in the software license schedule in step 314, the application file usage request is denied in step 316 and the application file request may be queued in step 322 waiting for an authorized concurrent user to discontinue usage. As authorized application file users discontinue usage of the application file, the recorded number of concurrent authorized users is correspondingly updated in step 320. If one or more usage requests are queued in step 322 when an application file usage is terminated in step 324, the software licensing management system determines the current time in step 304 and the process for determining whether the number of authorized concurrent users from step 320 is less than the maximum number of concurrent users allowed in the software license schedule in step 314 is repeated until all of the queued application file usage requests have been granted in step 316.

It is anticipated that as the business transitions between two scheduled time periods, a first time period having a greater number of concurrent users than the second time period, the number of authorized concurrent users may exceed the maximum number of concurrent application file allowed in the software license schedule during the transition. The excessive usage is expected and as concurrent users terminate usage of the application file, additional application file requests are denied until the number of authorized concurrent users from step 320 is less than the maximum number of concurrent users allowed in the software license schedule in step 314. Conversely, just before the business transitions between two scheduled time periods, a first time period having less concurrent users allowed than the second time period, application file requests may be queued until the present time transitions into the second time period. To prevent such an occurrence, the business may overlap time periods or otherwise tailor the software license schedule to prevent an adverse impact to the business.

Alternative embodiments will occur to those skilled in the art. Although the present periodic software licensing system has been described and illustrated for a network configuration having one software license schedule, two or more software license schedules may be concurrently operating within the same network. Similarly, although embodiments were described and illustrated wherein the software license server authorized the usage of an application file corresponding to the software license, the software license server may authorize concurrent usage of one or more features or the application file may contain one or more features that are independently authorized by a software license. Such variations and alternatives are contemplated, and can be made without departing from the spirit and scope of the invention claimed in the appended claims.

It is apparent that there has been described a periodic software licensing system that fully satisfies the objects, aims, and advantages set forth above. While the software license schedule has been described in conjunction with specific embodiments thereof, it is evident that many alternatives, modifications, and/or variations can be devised by those skilled in the art in light of the foregoing description. Accordingly, this description is intended to embrace all such alternatives, modifications and variations as fall within the spirit and scope of the appended claims.

What is claimed is:

1. A periodic software licensing system for authorizing a plurality of users to concurrently use a plurality of application files, that correspond to a plurality of software licenses, during predetermined time periods, the system comprising:
   a plurality of software license servers, each of which provides an associated set of users with access to application files, that correspond to ones of a plurality of software licenses allocated to said software license server;
   a single customer license entity for managing said plurality of software license servers, comprising:
      software license scheduler for storing data indicative of both a sequence of predetermined time periods and a corresponding maximum number of software licenses, which changes from time period to time period, that are available for use by said plurality of software license servers to concurrently serve said users, associated with each corresponding software license server, during each of said corresponding predetermined time periods;
      interval selector for determining a present one of said predetermined time periods in said sequence during which concurrent usage of said plurality of application files is available; and
      license manager for authorizing concurrent usage of said plurality of application files at said plurality of software license servers by said users of said single customer license entity during said present predetermined time period up to said corresponding maximum number of software licenses that are authorized for use by said single customer license entity during said present predetermined time period.

2. The periodic software licensing system of claim 1 further comprising:
   software license concurrent usage controller for allocating a subset of said plurality of software licenses for concurrent usage during said selected predetermined time period.

3. The periodic software licensing system of claim 1 further comprising:
   software license concurrent usage controller for assigning at least two different predetermined time periods wherein a subset of said plurality of software licenses is authorized for concurrent usage in each one of said at least two different predetermined time periods.

4. The periodic software licensing system of claim 1 wherein said license manager comprises:
   present time calculator for determining a present time during which a usage request is received from at least one of said plurality of users; and
   user authorization controller for authorizing said usage request if said present time is within said predetermined time period.

5. The periodic software licensing system of claim 4 further comprising:
   time interval calculator for processing said usage request and preventing authorizing said usage request if said present time is not within said predetermined time period.

6. A periodic software licensing system for authorizing concurrent usage of a varying number of application files to a plurality of users during predetermined time periods, the periodic software licensing system comprising:

a plurality of software license servers, each of which provides an associated set of users with access to application files;

a single customer license entity for managing said plurality of software license servers, comprising:

a plurality of software licenses allocated to said single customer license entity and corresponding to a plurality of application files, wherein each one of said plurality of software licenses authorizes usage of a corresponding one of said plurality of application files;

interval selector for scheduling a sequence of predetermined time periods, wherein the maximum number of software licenses available for concurrent use changes from predetermined time period to predetermined time period;

software license concurrent usage controller for allocating a subset of said plurality of software licenses to each of said software license controllers to enable concurrent usage of a corresponding subset of said plurality of application files at each of said software license controllers during said scheduled predetermined time period;

present time calculator for determining a present time; and license manager for authorizing concurrent usage of said subset of application files up to said corresponding maximum number of software licenses that are allocated during said selected predetermined time period when said present time is within said scheduled predetermined time period.

7. A periodic software licensing system for authorizing concurrent usage of a plurality of application files, corresponding to a plurality of software licenses, to a plurality of users during predetermined time periods, the periodic software licensing system comprising:

a plurality of software license servers, each of which provides an associated set of users with access to application files, that correspond to ones of a plurality of software licenses allocated to said software license server;

a single customer license entity for managing said plurality of software license servers, comprising:

a predetermined time period during which only a subset of said plurality of software licenses corresponding to said plurality of application files are available for authorization;

software license concurrent usage controller for determining a present time and authorizing concurrent usage of an application file corresponding to one of said plurality of software licenses when said present time is within said time period up to said corresponding plurality of software licenses that are allocated during said predetermined time period.

8. The periodic software licensing system of claim 7 further comprising:

software license scheduler for storing data indicative of a sequence of predetermined time periods and a corresponding maximum number of software licenses that are authorized during each of said corresponding predetermined time periods to enable concurrent use of said corresponding application files;

interval selector for selecting a one of said predetermined time periods in said sequence during which concurrent usage of said plurality of application files is available; and software license distributor for allocating a subset of said plurality of software licenses corresponding to a subset of said plurality of application files, wherein said subset of said plurality of application files is available during said time period.

9. The periodic software licensing system of claim 8 further comprising:

software license time interval assignment manager for assigning at least two time periods, wherein a corresponding one of said subset of said plurality of application files is available during said at least two time periods.

10. The periodic software licensing system of claim 7 wherein said software license allocation comprises:

user authorization controller, responsive to at least one usage request from at least one of said plurality of users for authorizing concurrent usage of at least one of said plurality of application files when said present time is within said time period.

11. A software management system for authorizing a plurality of users to concurrently use a plurality of application files that correspond to a plurality of software licenses during predetermined time periods, the software management system comprising:

a plurality of software license servers, each of which provides an associated set of users with access to application files, that correspond to ones of a plurality of software licenses allocated to said software license server;

a single customer license entity for managing said plurality of software license servers, comprising:

software license scheduler for storing data indicative of a sequence of predetermined time periods and a corresponding maximum number of software license, which changes from time period to time period, that are available for use by said plurality of software license servers to concurrently serve said users, associated with each corresponding software license server, which maximum number changes from time period to time period;

present time calculator for determining a present time period;

user authorization controller, responsive to at least one usage request from said plurality of users for authorizing usage of at least one of said plurality of application files corresponding to said at least one subset of said plurality of software licenses up to said corresponding number of software licenses in said subset that are authorized during said present time period.

12. A method for managing software licenses to authorize a plurality of users to concurrently use a plurality of application files, that correspond to a plurality of software licenses, during predetermined time periods, the method comprising:

allocating a plurality of software licenses to a single customer license entity, having a plurality of software license servers, each of which provides an associated set of users with access to application files, that correspond to ones of said plurality of software licenses allocated to said software license server;

managing said plurality of software license servers via a single customer license entity, comprising:

scheduling a sequence of predetermined time periods, each of which has an associated maximum number of said plurality of software licenses, which changes from time period to time period, available for use;

processing a usage request from at least one of said plurality of users;

determining a present time period; and authorizing concurrent usage of a one of said plurality of application files if said associated maximum number of software licenses for said present time period are not presently all in use.

13. The method of claim 12 further comprising:
allocating a subset of said plurality of software licenses for concurrent usage at each of said software license servers during said predetermined time period.

14. The method of claim 13 wherein authorizing concurrent usage comprises:
allocating, in response to receipt of at least one usage request from said plurality of users a subset of said plurality of software licenses to each of said software license servers.

* * * * *